United States Patent
Grolmusz

(10) Patent No.: US 7,606,847 B2
(45) Date of Patent: Oct. 20, 2009

(54) DENSE AND RANDOMIZED STORAGE AND CODING OF INFORMATION

(76) Inventor: Vince Grolmusz, Ugron Gabor u. 8., Budapest (HU) H-1118

( * ) Notice: Subject to any disclaimer, the term of this patent is extended or adjusted under 35 U.S.C. 154(b) by 579 days.

(21) Appl. No.: 10/709,969

(22) Filed: Jun. 10, 2004

(65) Prior Publication Data
US 2005/0216544 A1    Sep. 29, 2005

Related U.S. Application Data

(60) Provisional application No. 60/521,298, filed on Mar. 29, 2004.

(51) Int. Cl.
*G06F 17/10* (2006.01)
(52) U.S. Cl. ...................................... 708/203
(58) Field of Classification Search .................. 708/203
See application file for complete search history.

(56) References Cited

U.S. PATENT DOCUMENTS

| | | | |
|---|---|---|---|
| 4,914,615 A | 4/1990 | Karmarkar et al. | |
| 4,937,776 A | 6/1990 | Myers et al. | |
| 5,099,447 A | 3/1992 | Myszewski | |
| 5,227,994 A | 7/1993 | Mitsuharu | |
| 5,267,185 A | 11/1993 | Akabane et al. | |
| 5,319,586 A | 6/1994 | Gupta et al. | |
| 5,737,768 A | 4/1998 | Lloyd | |
| 6,078,938 A | 6/2000 | Pan et al. | |
| 6,157,740 A * | 12/2000 | Buerkle et al. | 382/233 |
| 6,160,918 A * | 12/2000 | Pigeon | 382/248 |
| 6,243,734 B1 | 6/2001 | Doshi et al. | |
| 6,737,993 B2 | 5/2004 | Watson | |
| 7,216,140 B1 * | 5/2007 | Chen et al. | 708/607 |
| 2003/0081705 A1 * | 5/2003 | Miller | 375/346 |
| 2004/0039903 A1 * | 2/2004 | Wise et al. | 712/300 |
| 2004/0101048 A1 * | 5/2004 | Paris | 375/240.12 |
| 2004/0221143 A1 * | 11/2004 | Wise et al. | 712/300 |

* cited by examiner

*Primary Examiner*—David H Malzahn

(57) ABSTRACT

We describe a method for dense encoding of information. Bennet and Wiesner (Phys. Rev. Lett. 69:2881-2884, 1992), using EPR-pairs, showed that n bits can be encoded by n/2 quantum-bits, from which the original bits can be retrieved. Here, in a completely different (non-quantum) setting, we give a method for more dense encoding: In our method n bits $x_1, x_2, \ldots, x_n$ are mapped by a linear transform B over the 6-element ring $Z_6$ to numbers $z_1, z_2, \ldots, z_t$ from ring $Z_6$ with $t=n^{o(1)}$(i.e., much fewer numbers) (Quantity o(1) here denotes a positive number which goes to 0 as n goes to infinity), then, by applying another linear transform C to these zi's, we will get back n elements of ring $Z_6$, $x'_1, x'_2, \ldots, x'_n$, where, e.g., $x'_1$ may have the form $x'_1=x_1+3x_2+4x_3$. One can get back $x_1$ simply by running through the values of $x_i$ on the set 0, 1, 2, 3, 4, 5, and noticing that only $x_1$ has period 6, ($3x_2$ has period 2, $4x_3$ has period 3). Our results generalize for any non-prime-power composite number m instead of 6. We also apply this method for fast computation of matrix multiplication and for compacting and extending matrices with linear transforms.

9 Claims, 6 Drawing Sheets

DENSE AND RANDOMIZED STORAGE AND CODING OF INFORMATION

CROSS REFERENCE TO RELATED APPLICATIONS

This application claims priority from U.S. provisional patent application Ser. No. 60/521,298 filed Mar. 29, 2004.

BACKGROUND OF INVENTION

The invention relates to data storage and retrieval in electronic forms, particularly to matrix storage and retrieval and the computation of matrix multiplication on electronic computers.

It is known from the prior art that general n-bit sequences cannot be compressed to a shorter binary sequence or cannot be encoded by less than n bits. However, using some fascinating physical phenomena and different models of computation, superdense coding is still possible. Bennet and Wiesner (C. H. Bennet and S. J. Wiesner. Communication via one- and two particle operators on Einstein-Podolski-Rosen states. Phys. Rev. Lett., 69:2881-2884, 1992.), using Einstein-Podolski-Rosen entangled pairs, showed that n classic bits can be encoded by n/2 quantum bits. However, it is not known how to build machines capable of storing quantum bits.

Storing and retrieving large amount of data is a challenge for today's technology, including computer technology, electronics, medical technology, signal processing, telecommunications technology etc. Because—generally—n bits cannot be compressed to less than n bits, storing twice the amount of data needs at least twice as large storage.

In many cases data is stored and manipulated in matrices. The storage and the manipulation of matrices is important in any applications involving electronically stored pictures and graphics as well as video. Linear optimization also deals with—generally very large—matrices. One of the most important matrix operations is the matrix multiplication. Matrix multiplications are computed very frequently on electronic computers. Any improvement on the speed or the storage requirements of the methods of prior art are of the interest of the technical applications.

REFERENCES

David H. Bailey: Extra high speed matrix multiplication on the Cray-2. SIAM J. Sci. Statist. Comput., 9(3):603-607, 1988.

C. H. Bennet and S. J. Wiesner. Communication via one- and two particle operators on Einstein-Podolski-Rosen states. Phys. Rev. Lett., 69:2881-2884, 1992.

Don Coppersmith and Shmuel Winograd. Matrix multiplication via arithmetic progressions. J. Symbolic Comput., 9(3):251-280, 1990.

Vince Grolmusz. Computing elementary symmetric polynomials with a sub-polynomial number of multiplications. SIAM Journal on Computing, 32(6):1475-1487, 2003.

Vince Grolmusz. Near quadratic matrix multiplication modulo composites. Technical Report TR03-001, ECCC, 2003.

Ran Raz. On the complexity of matrix product. In Proceedings of the thirty-fourth annual ACM symposium on Theory of computing. ACM Press, 2002.

Volker Strassen. Gaussian elimination is not optimal. Numerische Mathematik, 13:354-356, 1969.

SUMMARY OF INVENTION

Let m be a non-prime power, composite integer. For example, we may choose m=6. Let $x_1, x_2, \ldots, x_n$ be a sequence of n variables. Then, using linear transforms modulo 6, we compute $t=n^{o(1)} \ll n$ linear forms of the $x_i$ variables, denoted by $z_1, z_2, \ldots, z_t$, such that using another linear transform to these $z_j$'s, we get back the a representations of the $x_i$'s, namely $x_i+3(x_{i1}+x_{i2}+\ldots+x_{iu})+4(x_{j1}+x_{j2}+\ldots+x_{jv})$, for $i=1, 2, \ldots, n$, where the different indices mean different numbers (Quantity o(1) here denotes a positive number which goes to 0 as n goes to infinity). From our representation one can get back the actual $x_i$'s by using filtering, described also in this disclosure.

We apply the method, illustrated above to dense coding and storage of information, dense coding and storage of numbers and matrices, and also we apply the method to a very fast computation of a representation of the matrix product.

BRIEF DESCRIPTION OF DRAWINGS

Figure 5:
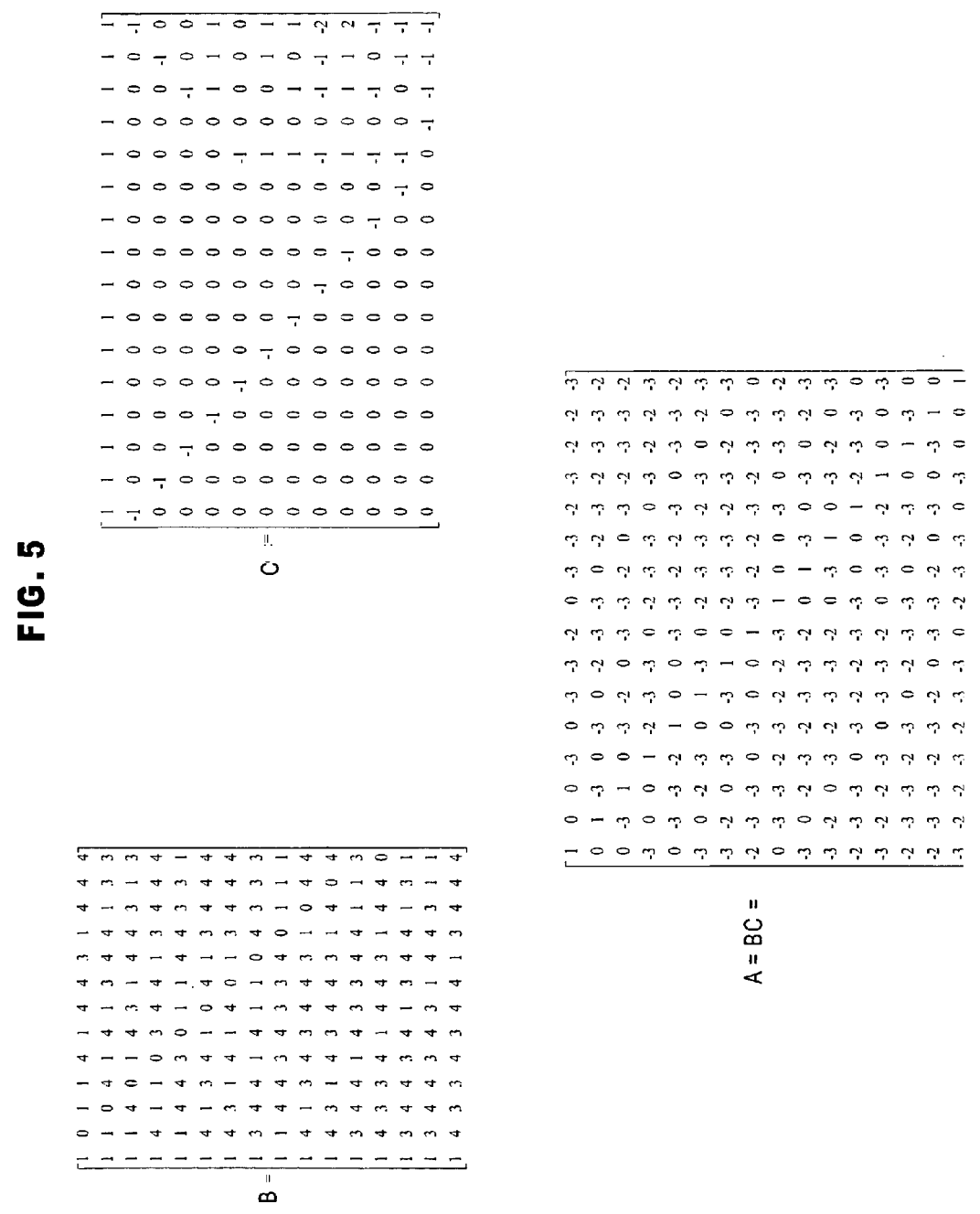

FIG. 5 gives examples for matrices A, B and C.

DETAILED DESCRIPTION

The present invention is described in part in Vince Grolmusz: Defying Dimensions Modulo 6, Electronic Colloquium on Computational Complexity Report TR03-058, (ISSN 1433-8092), Revision 2 (2004) which is incorporated herein by reference.

A general method was shown in (Vince Grolmusz: Low Rank Co-Diagonal Matrices and Ramsey Graphs, Electronic Journal of Combinatorics, Vol. 7, (2000), No. 1, R15) for the construction of n×n matrices A' with 0's in the diagonal and non-zeroes elsewhere modulo a non-prime power integer, denoted by m. Said construction has the main property that said matrices have small rank modulo m, that is, matrix A' can be written as the matrix product B'C' modulo m, where B' is an n×(t−1) and C' is a (t−1)×n matrix with integer elements, where t is a small number relative to n, that is, $t=n^{o(1)}$, where o(1) denotes a positive quantity which goes to 0 as n goes to the infinity.

It is also known from the prior art, that said matrix A' can be constructed that way, that if m has distinct prime divisors $p_1, p_2, \ldots, p_r$, then the non-zero elements of matrix A' are either 0 or 1 modulo $p_i$, for $i=1, 2, \ldots, r$. For example, if m=6, then the non-zero elements of matrix A' are either 3 or 4, modulo 6.

Let J denote the n×n all-1 matrix. Let us consider the matrix A=J−A'. It contains 1's in the diagonal, and numbers, congruent to zero modulo at least one prime divisor of m. Returning to the previous example, with m=6, we have that A has either 3 or 4 or 0 outside of the diagonal. Matrix A can be written as the matrix product BC modulo m, where B is an n×t and C is a t×n matrix with integer elements.

Figure 6:
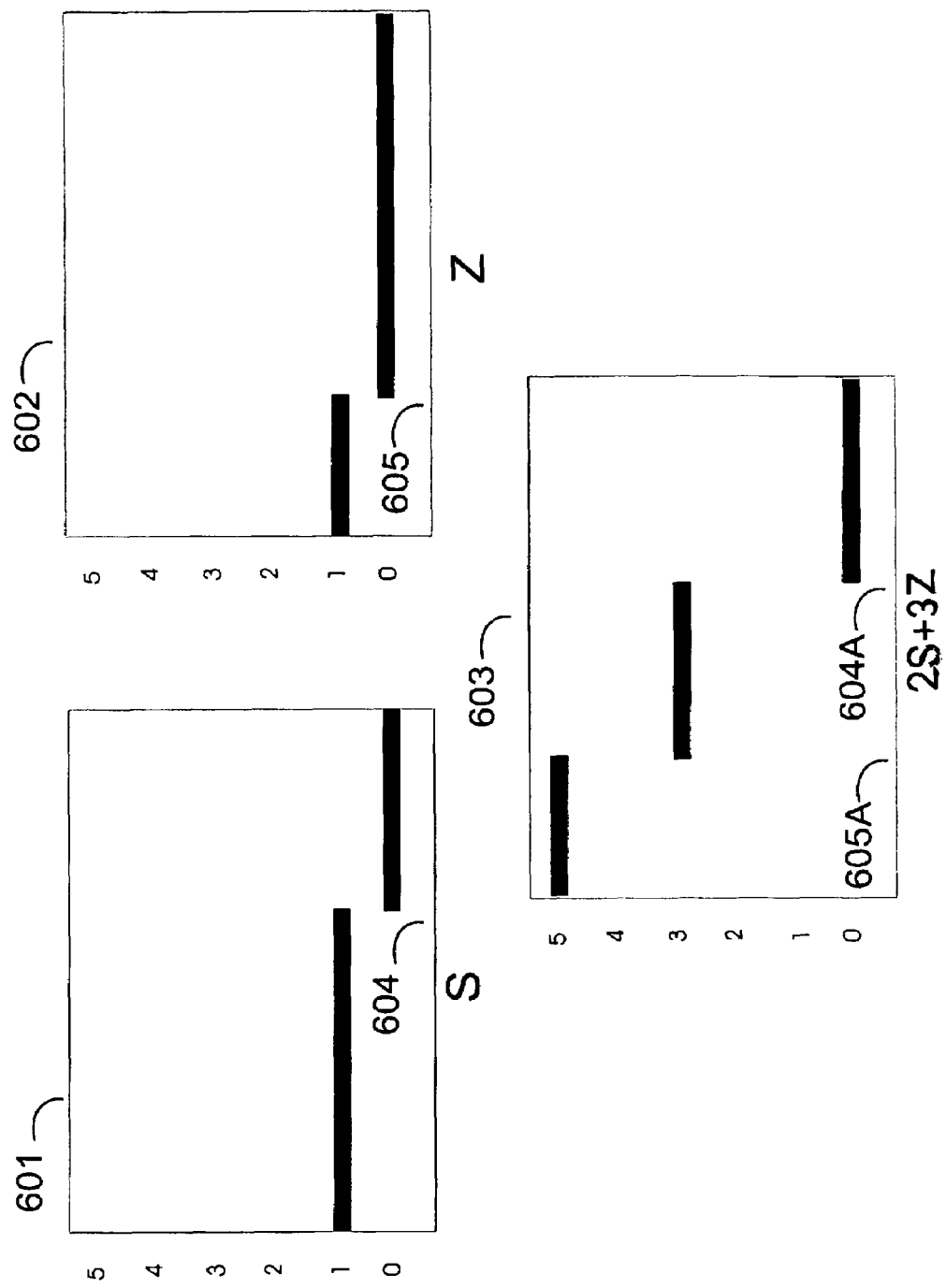
FIG. 6 gives examples for step-functions and the linear combination of step-functions.

FIG. 6 gives an example with m=6, n=16, t=13 for matrices A, B and C.

There are several other ways to construct matrices with similarly useful properties than that of A. Such method is known from the prior art (e.g., Vince Grolmusz: A Note on Explicit Ramsey Graphs and Modular Sieves, Combinatorics, Probability and Computing Vol. 12, (2003) pp. 565-569). Another way is to construct matrix A is as follows: the entry in row i and column j of matrix A is defined as the Hamming-distance of the binary forms of numbers i and j. By this definition we get matrices B and C such that A=BC, where B is an n×t and C is a t×n matrix with integer elements, and t=O(log n).

The larger the quantity n is, the smaller the quantity t becomes, relative to n. This property is used in the present disclosure to compactify electronically stored information.

Let $x=(x_1, x_2, \ldots, x_n)$ be a sequence of n variables. We compute $t=n^{o(1)}$ linear forms of the $x_i$'s, denoted by $z=(z_1, z_2, \ldots, z_t)$, such that using another linear transform to this z, we get back a representation of the x. More exactly, Let A=BC. Then let z=xB, and x'=zC=xBC=xA.

Figure 1:
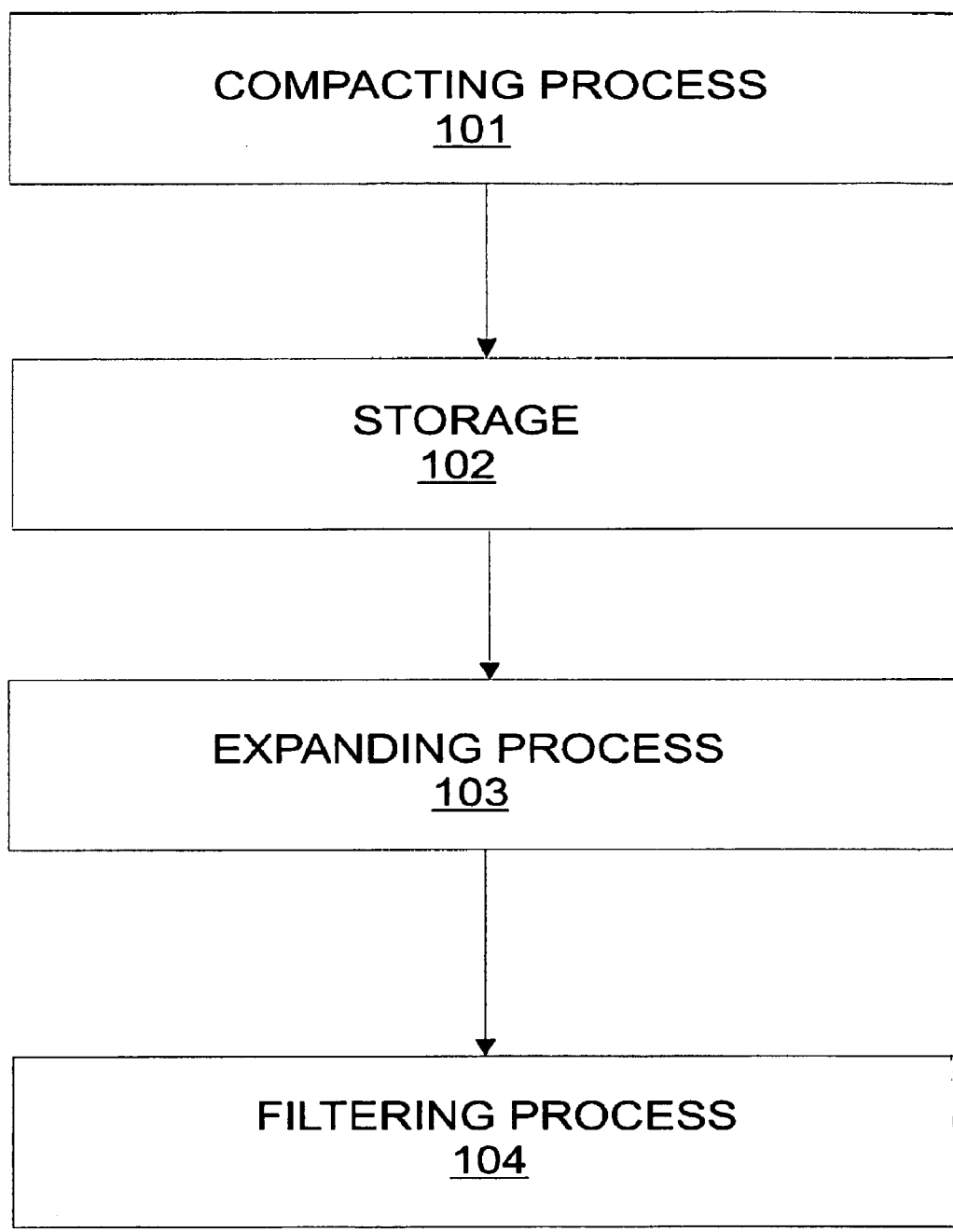
FIG. 1 is a flow chart illustrating the dense coding, storage and decoding of information.

FIG. 1 illustrates our method for compacting information. Compacting process 101 involves computing z=xB modulo m. The t coordinates of z can be stored (102) in a much smaller place than x. The expanding process 103 is computing zC, also modulo m. The filtering process 104 is meant to recover the original coordinates of the vector x from the vector x'=zC=xBC=xA.

Figure 2:
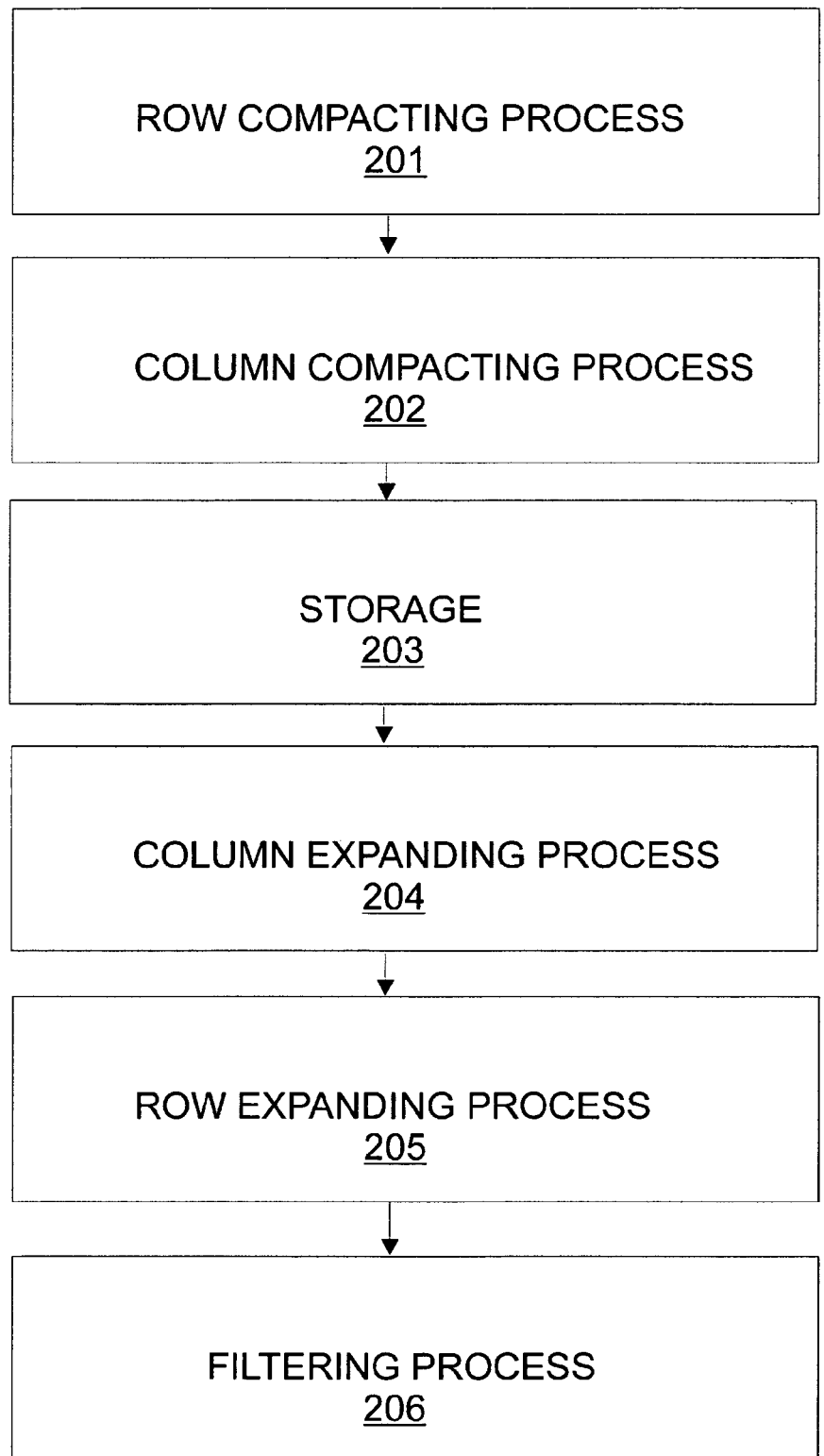
FIG. 2 is a flow chart illustrating the dense coding, storage and decoding of matrices.

FIG. 2 illustrates our method for compacting matrices. Let X be an n×n matrix. The row compacting process 201 is done by computing the n×t matrix XB. The column compacting process 202 is done by computing $B^T X B$, that is, a t×t matrix. In the storage 203 step this small matrix is stored. Retrieving the matrix is done in three phases: 204, 205, 206. The column expanding process 204 is done by computing $C^T B^T X B$, and the row expanding process 205 is done by computing the n×n matrix $X' = C^T B^T X B C$. The filtering process 206 is meant to recover the original matrix X from X'.

Figure 4:
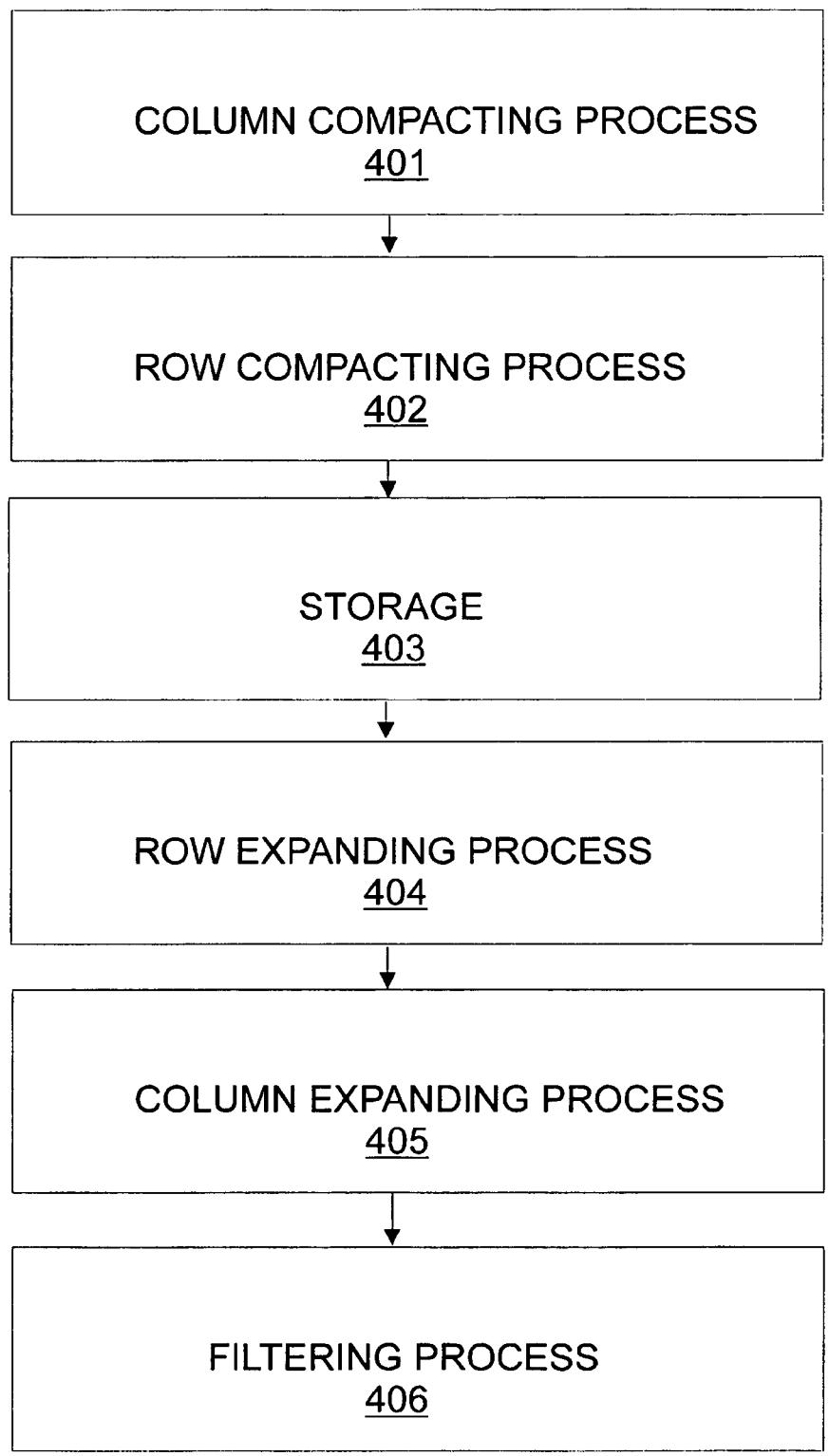
FIG. 4 is a flow chart illustrating an alternative method for dense coding, storage and decoding of matrices.

FIG. 4 illustrates an alternative method for compacting matrices. Let X be an n×n matrix. The column compacting process 401 is done by computing the t×n matrix $B^T X$. The row compacting process 402 is done by computing $B^T X B$, that is, a t×t matrix. In the storage 403 step this small matrix is stored. Retrieving the matrix is done in three phases: 404, 405, 406. The row expanding process 404 is done by computing $B^T X B C$, and the column expanding process 405 is done by computing the n×n matrix $X' = C^T B^T X B C$. The filtering process 406 is meant to recover the original matrix X from X'.

We disclose three methods for performing the filtering process (items 104, 406, 206). All of these methods aim to cancel out those variables or entries from the retrieved numbers or matrices, which have coefficients other than 1. This is necessary, since we get back xA=xBC in the case of the compacting-expanding process of FIG. 1, and $A^T X A$ in the case of matrix compacting and expanding in FIG. 2 and FIG. 4.

The first method for filtering is applicable for 0-1 values of variables $x=(x_1, x_2, \ldots, x_n)$. Here we change the values of the coordinates with value 1 to 0, one by one, and observe the change of the values of the variable $x'_i$, for i=1, 2, ..., n. Any change which is not −1 is neglected, and a change in $x'_i$ of value −1 means that the original value of $x_i$ was 1.

The second method involves a device called filter-machine. First, let m=6, and G(x)=f(x)+3g(x)+4h(x) be a polynomial of n variables $x=(x_1, x_2, \ldots, x_n)$ where the coefficient of every monomial appears in f is 1 modulo 6, and no monomial appears in two of the polynomials f, g, h with non-zero coefficients modulo 6. Then M is a mod 6 filter-machine for polynomial G(x), if for inputs polynomial G(x) and number G(s) for some s element of $\{0, 1, 2, 3, 4, 5\}^n$, M returns the value f(s) mod 6. With more details, the filter machine works as follows. Let us consider polynomial G(x), and suppose that we can repeatedly increment the value of polynomials f, g, and h, independently by 1. Then the period of 3g is 2, the period of 4h is 3, while the period of f is 6, all seen modulo 6. So if we were able to filter out the shorter period (that is, the higher frequency) waves then we were able to compute f(s). Note, that for doing this we need to substitute values from $Z_6$ instead just bits into the polynomials. Note also, that machine M does not need access to the actual values of the variables of the polynomials g and h, it just needs access to their periodically changed values. After filtering g and h out, the machine asks for the value of G(s), reduced by this filtering, which is just f(s). Let us see the most important example: the dot-product. Suppose that we would like to retrieve the value of $x_1 = s_1$ from set $\{0,1\}$. As the first coordinate of zC, we get $x'_1 = x_1 + 3(x_{i1} + x_{i2} + \ldots + x_{is}) + 4(x_{j1} + x_{j2} + \ldots + x_{jk})$, where $i_u$ is not equal to $j_v$, u=1, 2, ..., s, v=1, 2, ..., k. Now, M is assumed to have access to some values of $x_{i1} + x_{i2} + \ldots + x_{is}$ in order to filter them out, since their periodicity is at most 2 modulo 6; and also to some values of $x_{j1} + x_{j2} + \ldots + x_{jk}$ to filter them out, since their periodicity is at most 3 modulo 6. Note again, that their $s_i$ values are not needed at this phase, and, also, that typically, it is not enough to substitute 0 and 1 in the variables, 0, 1, 2, 3, 4, 5 may be needed. After identifying the higher frequency terms, M filters them out, and returns the value of f, which is $s_1$ in our case. Note, that we ask only here for the value of a variable. In the general case, when m differs from 6, but a non-prime power composite, we have seen that the non-diagonal elements of matrix A are zero for at least one prime divisor of m. That means that the period of those variables which have this non-diagonal element as coefficient, is a divisor of m, so in general an analogous method works for filtering out the variables with smaller periodicity coefficients.

The third filtering method disclosed involves randomized memory cells. Let $h_1, h_2, \ldots, h_n$ be the n bits to be stored. Then let $s_1, s_2, \ldots, s_n$ be step-functions (i.e., piece-wise constant functions) on the [0,1] interval, such that the following properties hold:

Function $s_i$ has finitely many, but at least one non-zero steps modulo m, for i=1, 2, ..., n. In addition, a step of function $s_i$ is either 0 modulo m or it is non-zero modulo all individual prime-divisors of number m, for i=1, 2, ..., n, No two different functions $s_i$ and $s_k$ have non-zero steps modulo m in the same point r in the real interval [0,1].

Note, that the last requirement can easily be met if the step-functions are chosen randomly.

FIG. 6 gives examples of step-functions S (item 601) and Z (item 602). The step of S is −1 at point 604, the step of Z is also −1 at step-point 605, while 2S+3Z (item 603) has step in 605A of value −2 and step in point 604A of value −3.

Now we describe the randomized memory, capable for high-density data storage. Bit $h_i$ is corresponded to $x_i = h_i s_i$, for i=1, 2, ..., n. Then we apply matrix B to x by computing z=xB. Note, that the linear combination of the step-functions modulo m are also step functions. Then the randomized storage of the bits $h_1, h_2, \ldots, h_n$ is done by the randomized piecewise constant functions $z_1, z_2, \ldots, z_t$. From the $z_i$'s, we compute $x'_i$'s as x'=zC=xBC. We then observe the change of the values of the piecewise constant function $x'_i$. If every change (that is, steps) of the function $x'_i$ is 0 modulo at least one prime divisor of m, then $h_i = 0$, otherwise, $h_i = 1$. The advantages of the method: One need not know the $s_i$, so $s_i$ can be some physical object (elementary particle state), one should only apply linear transforms to it, store it, then apply another linear transform to it, and observe only the the change of the function (i.e., the spectrum of the emitted photons by the particle).

Figure 3:
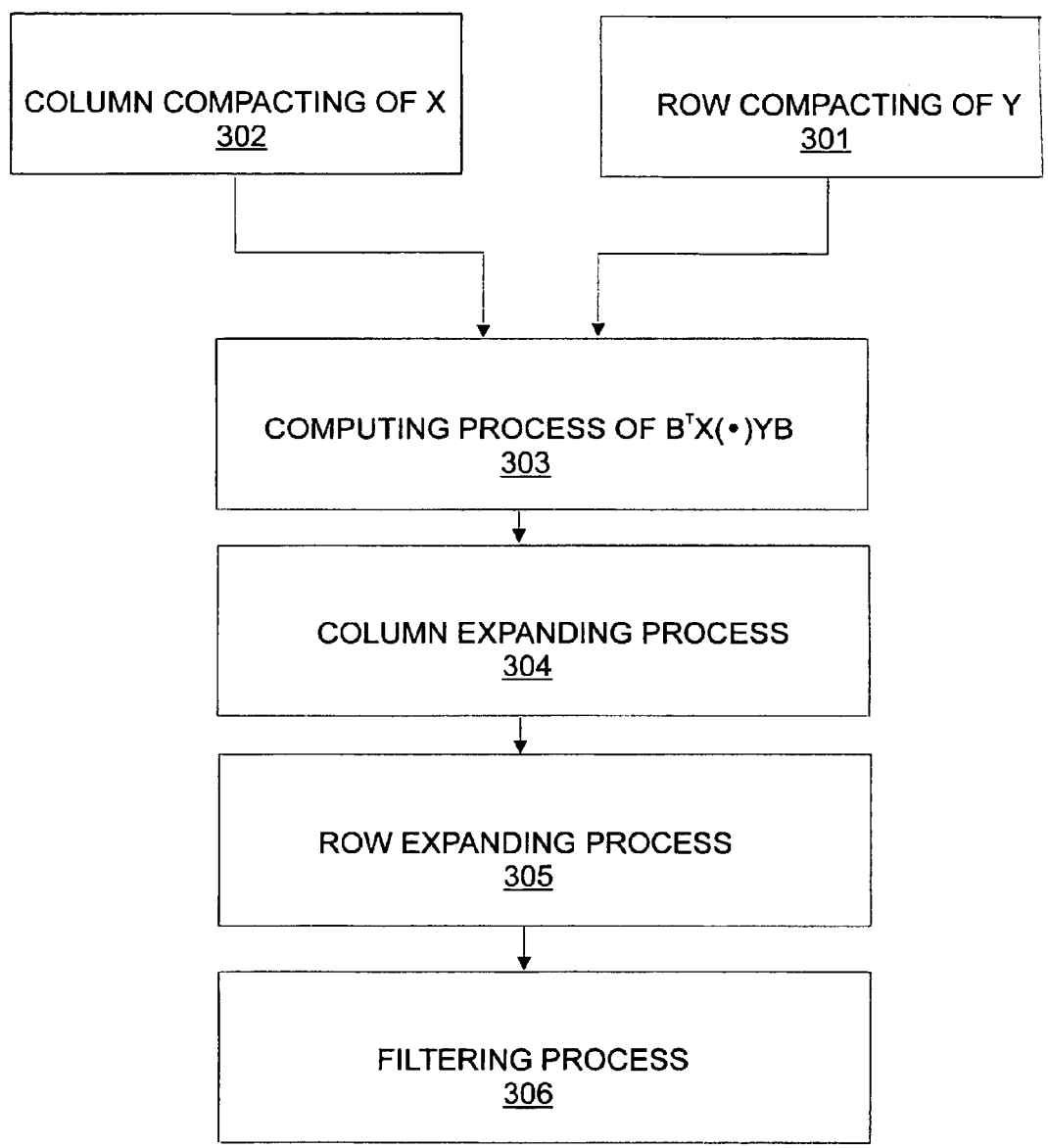
FIG. 3 is a flow chart illustrating the matrix multiplication method of the present disclosure.

FIG. 3 describes the fast matrix multiplication method. A method is disclosed for computing the representation of the product of the n×n matrix X and the n×n matrix Y with only $n^{o(1)}$ multiplications. The column compacting 302 of matrix X is done by computing $B^T X$. The row compacting 301 of Y is done by computing YB. Next, a certain product 303 of the t×n matrix $B^T X = \{u_{ij}\}$ and the n×t matrix $YB = \{v_{kl}\}$ is computed as follows. The t×t matrix $W = \{w_{il}\}$ is computed as $$w_{il} = t\Sigma^t_{j=1}(1\Sigma^n_{k=1}b_{kj}u_{ik})(1\Sigma^n_{k=1}c_{jk}v_{kl}).$$

Computing $w_{il}$ uses only t non-scalar multiplications, consequently, computing matrix W uses only $t^3 = n^{o(1)}$ multiplications.

Column expanding process 304 is done by computing $C^T W$, and the row expanding process 305 is done by computing $C^T WC$. Steps 304 and 305 can be exchanged in the method. At the end a filtering process 306 is done for retrieving the values of the product matrix.

Although the subject invention has been described with respect to particular embodiments, it will be readily apparent to those having ordinary skill in the art to which it pertains that changes and modifications may be made thereto without departing from the spirit or scope of the subject invention as defined by the appended claims.

The invention claimed is:

1. A method for dense encoding and retrieving of information represented in electronic computers, the method comprising
    (a) choosing an appropriate modulus m, positive integer n, corresponding to the number of bits to be encoding, and generating n×n matrix A with integer elements where the diagonal elements of A differs modulo m from all the other elements of their column, and where A can be written as matrix product BC where B is an n×t matrix, C is a t×n matrix, where t is less than n;
    (b) encoding the length-n vector x to the length-t vector xB, by vector-matrix product modulo m;
    (c) storing the length-t vector xB in physical computational devices;
    (d) retrieving the stored vector by computing xBC=xA by vector-matrix product modulo m;
    (e) for every coordinate of vector xBC=xA, filtering out the terms added as the linear combination of other coordinates of vector x.

2. A method according to claim 1, wherein the modulus m is non-prime-power composite positive integer, the diagonal elements of matrix A are non-zero modulo any prime-divisors of m, and each non-diagonal elements of matrix A are zero modulo for at least one prime divisor of m.

3. A method according to claim 2, wherein the filtering step for retrieving the original values of the encoded 0-1 vector x further comprising:
    (a) periodical change of the values of the coordinates of vector x with original value equal to 1 on values 0, 1, 2, . . . , m−1, and no change of the values of the coordinates of vector x with original value equal to 0;
    (b) measuring the periodicity of each coordinates of vector xBC=xA;
    (c) if a coordinate has period equal to m then its original value was 1.

4. A method according to claim 1, wherein vector x to be compacted is a row-vector of a matrix.

5. A method according to claim 1, wherein vector x to be compacted is a column-vector of a matrix.

6. A system for dense encoding and retrieving of information represented in electronic computers or other physical devices, the system comprising
    (a) choosing a modulus m to be a non-prime-power composite positive integer, positive integer n corresponding to the number of bits to be encoded, and generating n×n matrix A with the diagonal elements being non-zero modulo any prime-divisors of m, and each non-diagonal elements of matrix A are zero modulo for at least one prime divisor of m, and where A can be written as matrix product BC where B is an n×t matrix, C is a t×n matrix, where t is less than n;
    (b) choosing step functions $s_1, s_2, \ldots, s_n$ on the real interval, corresponding to time, such that the following properties hold:
    (b1) function s has finitely many, but at least one non-zero steps modulo m, for
    (b2) the step of function s is either 0 modulo m or it is non-zero modulo all individual prime-divisors of number m, for i=1, 2, . . . , n;
    (b3) no two different functions $s_1$ and $s_k$ have non-zero steps in the same point r in the real interval;
    (c) encoding bit-sequence $h_1, h_2, \ldots, h_n$, such that bit $h_i$ is encoded by $x_i = h_i s_i$, for i=1, 2, . . . , n;
    (d) computing quantity z=xB, by using matrix B and vector x;
    (e) storing step functions $z_i, z_2, \ldots, z_i$;
    (f) computing x'=zC=xBC modulo m;
    (g) observing the change of the values of the piecewise constant function $x_i'$, for i=1, 2, . . . , n; and identifying $h_i=0$ if all the steps of function $x_i'$ are 0 modulo at least one prime divisor of m, otherwise, identifying $h_i=1$.

7. A system, according to claim 6, wherein step-functions are stored in physical devices admitting linear combinations, and the values of the steps modulo m can be observed from the spectrum of electromagnetic radiation emitted by the devices.

8. A system according to claim 6, wherein vector $h=h_1, h_2, \ldots, h_n$ to be compacted is a row-vector of a matrix.

9. A system according to claim 6, wherein vector $h=h_1, h_2, \ldots, h_n$ to be compacted is a column-vector of a matrix.

* * * * *